(12) United States Patent
Kim et al.

(10) Patent No.: US 9,454,790 B2
(45) Date of Patent: Sep. 27, 2016

(54) APPARATUS AND METHOD FOR DISPLAYING WATERMARK ON A SCREEN

(75) Inventors: Nam-Sic Kim, Goyang-Si (KR); Jeong-Moon Oh, Seoul (KR); Dong-Seok Han, Seoul (KR)

(73) Assignee: FASOO.COM CO., LTD, Seoul (KR)

( * ) Notice: Subject to any disclaimer, the term of this patent is extended or adjusted under 35 U.S.C. 154(b) by 298 days.

(21) Appl. No.: 14/351,473

(22) PCT Filed: Aug. 20, 2012

(86) PCT No.: PCT/KR2012/006607
§ 371 (c)(1),
(2), (4) Date: Apr. 11, 2014

(87) PCT Pub. No.: WO2013/055029
PCT Pub. Date: Apr. 18, 2013

(65) Prior Publication Data
US 2014/0247961 A1    Sep. 4, 2014

(30) Foreign Application Priority Data

Oct. 11, 2011   (KR) .................. 10-2011-0103745

(51) Int. Cl.
| | | |
|---|---|---|
| *G06K 9/00* | (2006.01) | |
| *G06T 1/00* | (2006.01) | |
| *H04N 21/8358* | (2011.01) | |
| *H04N 21/488* | (2011.01) | |

(Continued)

(52) U.S. Cl.
CPC .............. *G06T 1/0021* (2013.01); *G06F 3/14* (2013.01); *H04N 21/4312* (2013.01); *H04N 21/4316* (2013.01); *H04N 21/454* (2013.01); *H04N 21/4623* (2013.01); *H04N 21/4882* (2013.01); *H04N 21/8358* (2013.01); *G09G 2340/0464* (2013.01); *G09G 2340/12* (2013.01); *G09G 2358/00* (2013.01)

(58) Field of Classification Search
None
See application file for complete search history.

(56) References Cited

U.S. PATENT DOCUMENTS

| | | | |
|---|---|---|---|
| 6,182,218 B1 | 1/2001 | Saito | |
| 8,312,552 B1 * | 11/2012 | Hadden | ................ G06F 21/10 713/176 |

(Continued)

FOREIGN PATENT DOCUMENTS

| | | |
|---|---|---|
| EP | 2009912 A2 | 12/2008 |
| JP | 06214862 A | 8/1994 |

(Continued)

*Primary Examiner* — Stephen R Koziol
*Assistant Examiner* — Amandeep Saini
(74) *Attorney, Agent, or Firm* — William Park & Associates Ltd.

(57) ABSTRACT

There is provided a method and apparatus for displaying a watermark on a screen. According to the present invention, when an application is executed or a document is opened by a user's manipulation, it is determined whether a watermark is displayed based on a message generated from an operating system and screen watermark display policies, and when it is determined that the watermark is displayed, the watermark is displayed on a screen. According to the present invention, when the watermark is displayed on a screen, it is possible to provide a user with notification that corresponding content is important content or confidential content. Even when the screen is captured or is imaged using a camera, the watermark is displayed in the captured image or the imaged video. Therefore, it is possible to identify that the corresponding content is important content or confidential content. As a result, it is possible to increase user awareness of security.

19 Claims, 6 Drawing Sheets

(51) Int. Cl.
  *H04N 21/454* (2011.01)
  *H04N 21/431* (2011.01)
  *H04N 21/4623* (2011.01)
  *G06F 3/14* (2006.01)

(56) References Cited

U.S. PATENT DOCUMENTS

| | | | |
|---|---|---|---|
| 8,526,666 B1 * | 9/2013 | Hadden | G06F 21/10 345/592 |
| 2002/0090109 A1 | 7/2002 | Wendt | |
| 2007/0248240 A1 | 10/2007 | Epstein | |
| 2009/0175490 A1 | 7/2009 | Price | |
| 2010/0073564 A1 | 3/2010 | Iino | |
| 2010/0205628 A1 | 8/2010 | Davis et al. | |

FOREIGN PATENT DOCUMENTS

| | | |
|---|---|---|
| JP | 2004152260 A | 5/2004 |
| JP | 2006129245 A | 5/2006 |
| JP | 2006166155 A | 6/2006 |
| JP | 2011164885 A | 8/2011 |

* cited by examiner

APPARATUS AND METHOD FOR DISPLAYING WATERMARK ON A SCREEN

CROSS-REFERENCE TO RELATED PATENT APPLICATION

This application claims the benefit of Korean Patent Application No. 10-2011-0103745, filed on Oct. 11, 2011, in the Korean Intellectual Property Office, the disclosure of which is incorporated herein in its entirety by reference.

BACKGROUND OF THE INVENTION

1. Field of the Invention

The present invention relates an apparatus and method for displaying a watermark on a screen, and more specifically, to an apparatus and method for displaying a watermark on a screen based on screen watermark display policies.

2. Description of the Related Art

Recently, due to the development of computers and network technology, intellectual property issues caused by illegal copy or distribution of digital content are significantly emerging. Due to the nature of the digital content, it is possible to produce a copy that is the same as the original with ease. Therefore, authors may have a serious economic loss. Accordingly, copyright protection technology for preventing illegal copy and effectively protecting ownership is required.

As technology for protecting digital content, there have been many advances in access control technology using an encryption technique or a firewall. However, digital content of which a password is cracked once may be illegally copied and distributed. Also, users who have access may abuse digital content and illegally copy and distribute. Therefore, recently, digital watermarking that is technology for preventing illegal copy or distribution and efficiently protecting copyright by inserting proprietary information into digital content itself is increasingly grabbing an interest.

Such digital watermarking is technology for inserting unique information of an owner of copyright into content in order to eradicate commercial fraud such as illegal copy, distribution, and forgery of various types of multimedia content. Here, the unique information of an owner of copyright to be inserted is referred to as a watermark.

However, since such a digital watermark is inserted into digital content, when content having no watermark inserted therein is displayed on a screen, content thereof may be leaked by capturing a screen or imaging a screen using a camera. In addition, since the watermark inserted into digital content changes according to a size of an area on which corresponding digital content is displayed, when the size and the like of an area on which corresponding digital content is displayed are changed, the watermark is destroyed and displayed.

SUMMARY OF THE INVENTION

The present invention relates to an apparatus and method for displaying a watermark on a screen based on screen watermark display policies.

According to an aspect of the present invention, there is provided a watermark display apparatus. The apparatus includes a monitoring unit configured to monitor a message generated from an OS when an application is executed or a document is opened by a user's manipulation; a watermark display determining unit configured to determine whether a watermark is displayed based on the message received from the monitoring unit and screen watermark display policies; and a watermark display unit configured to display the watermark on a screen when it is determined by the watermark display determining unit that the watermark is displayed.

According to another aspect of the present invention, there is provided a method of displaying a watermark. The method includes monitoring a message generated from an OS when an application is executed or a document is opened by a user's manipulation; determining whether a watermark is displayed based on the message and screen watermark display policies; and displaying the watermark on a screen when it is determined that the watermark is displayed.

According to still another aspect of the present invention, there is provided a computer readable recording medium recording a program causing a computer to execute any of the above watermark display methods.

In an apparatus and method for displaying a watermark on a screen according to the present invention, as the watermark is displayed on a screen, it is possible to provide a user with notification that corresponding content is important content or confidential content. Also, even when the screen is captured or is imaged using a camera, the watermark is displayed in the captured image or the imaged video. Therefore, it is possible to identify that the corresponding content is important content or confidential content. As a result, it is possible to increase user awareness of security.

Further, even when a size, a position, and the like of an application window or an application window corresponding to a document are changed, a size of a window on which the watermark is displayed is not changed. Accordingly, the watermark may not be destroyed and displayed on a screen in a normal size.

Moreover, the watermark is displayed on a screen only when important content or confidential content is actually displayed on a screen. Accordingly, it is possible to effectively increase user awareness of security. When no important content or confidential content is actually displayed on a screen, the watermark disappears from the screen. Therefore, it is possible to remove elements disturbing the user's tasks.

DETAILED DESCRIPTION OF THE INVENTION

Hereinafter, exemplary embodiments of an apparatus and method for displaying a watermark on a screen according to the present invention will be described with reference to the accompanying drawings.

First, an apparatus (hereinafter referred to as a "watermark display apparatus") for displaying a watermark on a screen according to an embodiment of the present invention will be described in detail with reference to FIG. 1.

Figure 1:
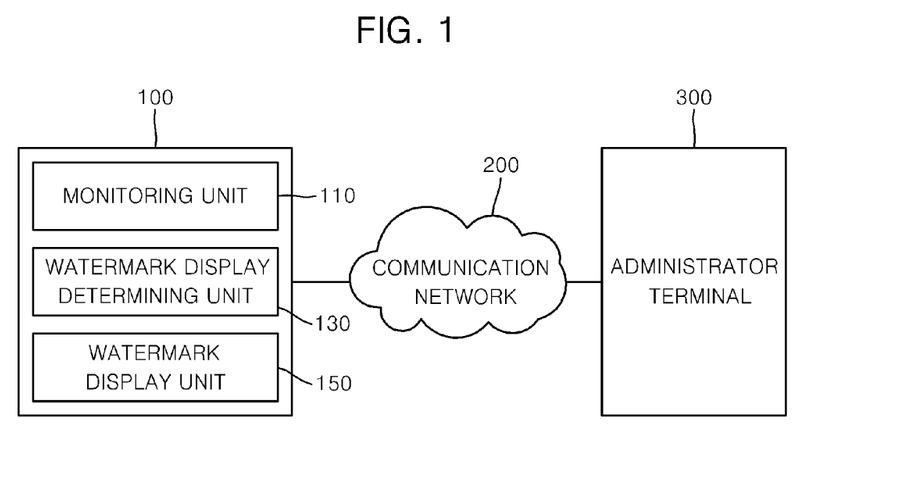
FIG. 1 is a block diagram illustrating a watermark display apparatus according to an embodiment of the present invention.

FIG. 1 is a block diagram illustrating a watermark display apparatus according to an embodiment of the present invention.

As illustrated in FIG. 1, a watermark display apparatus 100 according to an embodiment of the present invention includes a monitoring unit 110, a watermark display determining unit 130, and a watermark display unit 150, and is connected to an administrator terminal 300 via a communication network 200.

The watermark display apparatus 100 displays a watermark on a screen based on screen watermark display policies. Here, the screen watermark display policies include watermark display target information, watermark display information, and the like.

The watermark display target information includes an operating system (OS) item, an application item, a document item, and the like, which are watermark display targets. That is, the watermark display target information includes information on a target item in which a watermark is displayed such as an OS, a specific application, and a specific document. For example, when watermark display target information A includes the OS item, a watermark is displayed on a screen when the OS is driven and executed. When watermark display target information B includes a Word item of Microsoft, a watermark is displayed on a screen when Word is executed and operated. When watermark display target information C includes an item of "aaa.jpg," a watermark is displayed on a screen when a file of "aaa.jpg" is opened.

Here, the OS refers to software that operates a terminal such as the watermark display apparatus 100, manages operation of the terminal, and provides an environment in which applications can be executed. Examples of OSs include Windows® of MICROSOFT, Mac® OS of APPLE, Chrome® OS of GOOGLE, Unix®, Linux®, and the like. An application is software operated on the OS and refers to software for performing a specific task such as document writing, picture editing, or intranet access. The document refers to a file written by the application.

Also, the watermark display target information may include information on a type item of the application and a type item of the document, which are watermark display targets. Here, the type of the application collectively refers to applications belonging to the same kind (document writing application) such as a Word of MICROSOFT, a Hancom Office of HANCOM, and a Notepad, and refers to an application group that provides the same function. Further, the type of the document collectively refers to a document having a specific extension (for example, "jpg"), and refers to a document group that can open a corresponding document using the same application. When watermark display target information D includes, for example, a document writing application item, a watermark is displayed on a screen when the document writing application such as a Word of MICROSOFT, a Hancom Office of HANCOM, and a Notepad is executed and operated. When watermark display target information E includes a document item having an extension of "jpg," a watermark is displayed on a screen when a file having an extension of "jpg" is opened.

In this case, each item included in the watermark display target information may correspond to information on a time (such as a period, a day, and a time zone) at which a watermark is displayed. When the watermark display target information E includes, for example, an item of Word of Microsoft (weekend), no watermark is displayed on a screen if Word is executed and operated on weekdays, and a watermark is displayed on a screen if Word is executed and operated on weekends. When watermark display target information F includes an item of Word of Microsoft (9 am to 6 pm on weekdays), no watermark is displayed on a screen if Word is executed and operated on weekends, before 9 am on weekdays, and after 6 pm on weekdays, and a watermark is displayed on a screen if Word is executed and operated between 9 am and 6 pm on weekdays. When watermark display target information G includes an item of "bbb.pdf" (2011.07.01 to 2011.10.31), no watermark is displayed on a screen if "bbb.pdf" is opened before 2011.07.01 or after 2011.10.31, and a watermark is displayed on a screen if "bbb.pdf" is opened between 2011.07.01 and 2011.10.31.

The watermark display information includes content of the watermark, a display size of the watermark, a display position of the watermark, and the like. Here, the content of the watermark refers to content displayed on a screen as a watermark, and includes expressions such as "confidential" and "secret," a company name, and a company logo. The display size of the watermark refers to a size of the watermark displayed on a screen, and includes a horizontal length, a vertical length, and the like. The display position of the watermark refers to a position of the watermark displayed on a screen, and includes coordinate values of an upper-left corner, a lower-left corner, an upper-right corner, a lower-right corner, and the like.

Such screen watermark display policies may be received from the administrator terminal 300 and pre-stored in the watermark display apparatus 100 or may be received from the administrator terminal 300 when the watermark display apparatus 100 is driven, that is, when OS is driven or a user is logged in. Needless to say, the screen watermark display policies may also be set by the user.

In addition, the screen watermark display policies may be set differently for each user. That is, the screen watermark display policies correspond to user information used in login. For example, when a user A and a user B use a terminal, the screen watermark display policies correspond to each account used when the user A logs in the terminal and the user B logs in the terminal. Therefore, when the user A is logged in, it is determined whether the watermark is displayed based on a screen watermark display policy A, and when the user B is logged in, it is determined whether the watermark is displayed based on a screen watermark display policy B.

The watermark display apparatus 100 may include terminals having a memory unit, a microprocessor, and computing power such as a laptop computer, a workstation, a palmtop computer, an ultra mobile personal computer (UMPC), a tablet PC, a personal digital assistant (PDA), a web pad, and a cellular phone in addition to a desktop computer. That is, a watermark display module (not illustrated) for performing a watermark display determining function, a watermark display function, and the like according to the embodiment of the present invention may be installed in an existing terminal and perform related functions. In this case, the watermark display apparatus 100 refers to a terminal having the watermark display module installed therein.

The administrator terminal 300 provides the screen watermark display policies to the watermark display apparatus 100. In this case, the administrator terminal 300 may provide a corresponding screen watermark display policy according to user information or identification information of the watermark display apparatus 100 from which the screen watermark display polices are requested. Here, the identification information of the watermark display apparatus 100 includes a MAC address, an Internet protocol (IP) address, and the like. The user information includes user account information such as an identification (ID) of a user logged in the watermark display apparatus 100.

The communication network 200 may include a data communication network such as a local area network (LAN), a metropolitan area network (MAN), a wide area network (WAN), and the Internet, and a telephone network. Any communication method may also be used regardless of wireless or wired communication.

Hereinafter, the watermark display apparatus 100 according to an embodiment of the present invention will be described in detail with reference to FIGS. 2 to 6.

Figure 2:
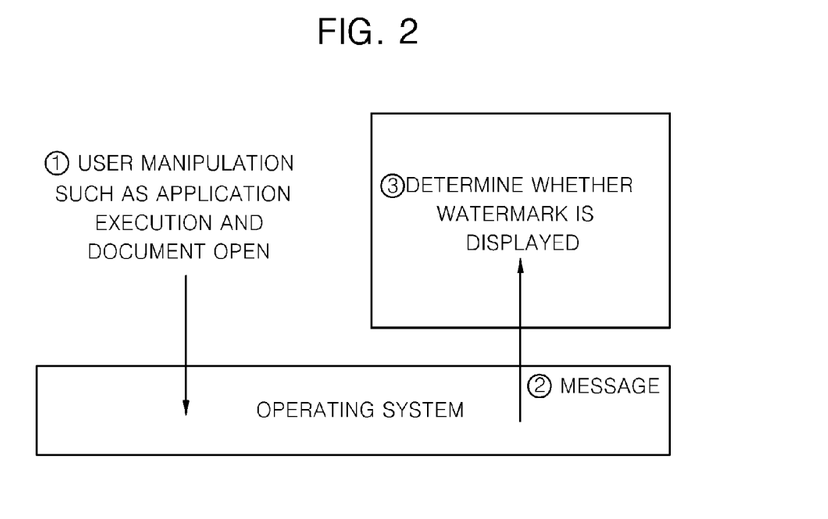
FIG. 2 is a diagram illustrating a watermark display determining process according to an embodiment of the present invention.

FIG. 2 is a diagram illustrating a watermark display determining process according to an embodiment of the present invention. FIGS. 3 to 6 are diagrams illustrating exemplary watermark displays according to an embodiment of the present invention.

When an application is executed or a document is opened by a user's manipulation, the monitoring unit 110 monitors a message generated from the OS. That is, when the OS is driven, that is, booted, information of the monitoring unit 110 is registered in the OS. Then, the monitoring unit 110 receives or intercepts the message generated from the OS by the user's manipulation, and provides the message to the watermark display determining unit 130. When the OS is, for example, Window of Microsoft, the information of the monitoring unit 110 is registered in computer based training (CBT) hook chain, windows management instrumentation (WMI), and the like. Then, when open, minimize, restore, and close of an application or open, close, and the like of a document are generated by the user's manipulation, the monitoring unit 110 receives or intercepts a message such as an application generation message and an application end message from the OS.

The monitoring unit 110 provides the message received or intercepted from the OS to the watermark display determining unit 130. In addition, when the OS is driven, that is, booted, the monitoring unit 110 provides a message indicating an OS driving state to the watermark display determining unit 130.

The watermark display determining unit 130 determines whether the watermark is displayed based on the message received from the monitoring unit 110 and the screen watermark display policies. That is, the watermark display determining unit 130 uses the message received from the monitoring unit 110 to determine whether an OS item, an item corresponding to the application executed or the document opened by the user's manipulation, and the like are included in the watermark display target information. When the item is included in the watermark display target information, the watermark display determining unit 130 determines that the watermark is displayed.

When watermark display target information 1 includes, for example, the OS item, it is determined that the watermark is displayed on a screen when the OS is driven or operated. When watermark display target information 2 includes the item of Word of Microsoft, it is determined that the watermark is displayed on a screen when Word is executed and operated by the user's manipulation. When watermark display target information 3 includes an item of "aaa.jpg," it is determined that the watermark is displayed on a screen when a file of "aaa.jpg" is opened by the user's manipulation. In this case, when a document file 1 (for example, "111.doc") and a document file 2 (for example, "222.doc") are document files having the same type (for example, Word of Microsoft), an item of the document file 1 ("111.doc") and an item of the application (Word of Microsoft) corresponding thereto are included in the watermark display target information, and an item of the document file 2 ("222.doc") is not included in the watermark display target information, it is determined that the watermark is displayed on a screen when the document file 1 ("111.doc") is opened by the user's manipulation, and it is determined that no watermark is displayed on a screen when the document file 2 ("222.doc") is opened. In other words, the watermark display target information has a priority, and displaying of the watermark is determined based on the priority.

As illustrated in FIG. 2, when there is the user's manipulation such as application execution and document open (process ①), the OS delivers a message to the monitoring unit 110 or the monitoring unit 110 intercepts a message (process ②), and the watermark display determining unit 130 determines whether the watermark is displayed based on the message received from the monitoring unit 110 and the screen watermark display policies (process ③).

Figure 3:
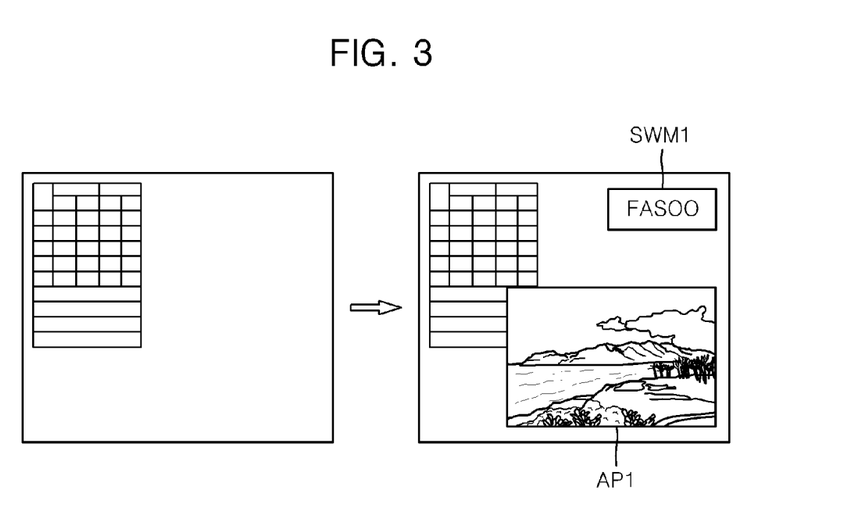
FIGS. 3 to 6 are diagrams illustrating exemplary watermark displays according to an embodiment of the present invention.

When it is determined by the watermark display determining unit 130 that the watermark is displayed, the watermark display unit 150 displays the watermark on a screen. As illustrated in FIG. 3, for example, when an application is executed by the user's manipulation, a window (AP1) corresponding to the application is displayed on a screen. When a corresponding application is included in the watermark display target information, the watermark display unit 150 displays a watermark (SWM1) on a screen.

In this way, when the watermark is displayed on a screen, it is possible to provide the user with notification that corresponding content is important content or confidential content. Also, even when the screen is captured or the screen is imaged using a camera, the watermark is displayed in the captured image or the imaged video. Therefore, it is possible to identify that the corresponding content is important content or confidential content. As a result, it is possible to increase user awareness of security.

The watermark display unit 150 may display the watermark on a screen as a window independent from a window corresponding to the application executed or the document opened by the user's manipulation. In this case, the watermark display unit 150 may display a window on which the watermark is displayed in an internal area of the window corresponding to the application executed or the document opened by the user's manipulation.

Figure 4:
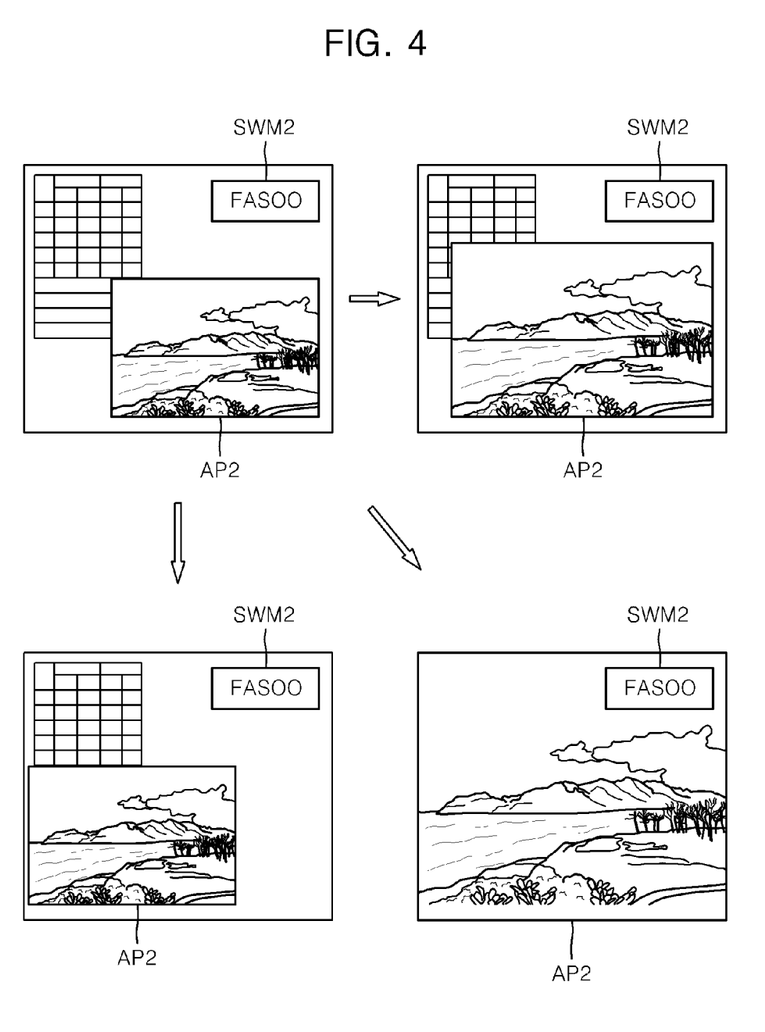

That is, when a size or a position of the window corresponding to the application executed or the document opened by the user's manipulation is changed, the watermark display unit 150 may maintain a size and a position of the window on which the watermark is displayed without change. As illustrated in FIG. 4, for example, when an application is executed by the user's manipulation, a window (AP2) corresponding to the application is displayed on a screen, and when the application is included in the watermark display target information, a watermark (SWM2) is displayed on a screen. Then, even when a size, a position, and the like of the application window (AP2) are changed by the user's manipulation, the watermark (SWM2) is displayed on a screen while maintaining its size, position, and the like without change.

Figure 5:
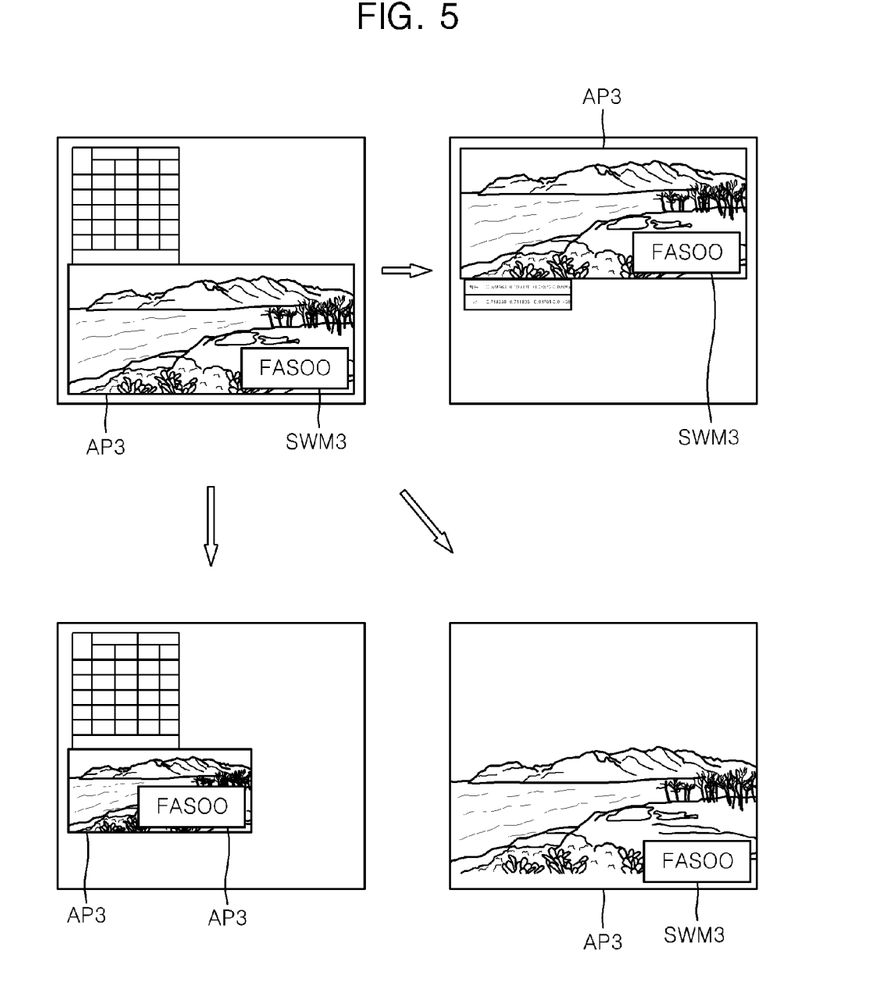

Meanwhile, when the size or the position of the window corresponding to the application executed or the document opened by the user's manipulation is changed, the watermark display unit 150 may maintain the size of the window on which the watermark is displayed without change and change its position. As illustrated in FIG. 5, for example, when an application is executed by the user's manipulation, a window (AP3) corresponding to the application is displayed on a screen, and when the application is included in the watermark display target information, a watermark (SWM3) is displayed on a screen. Then, when a size, a position, and the like of the application window (AP3) are changed by the user's manipulation, the watermark (SWM3) maintains its size without change and only a position thereof is changed.

In this way, even when the size, the position, and the like of the application window or the application window corresponding to the document are changed, the size of the window on which the watermark is displayed is not changed. Accordingly, the watermark may not be destroyed and displayed on a screen in a normal size.

Figure 6:
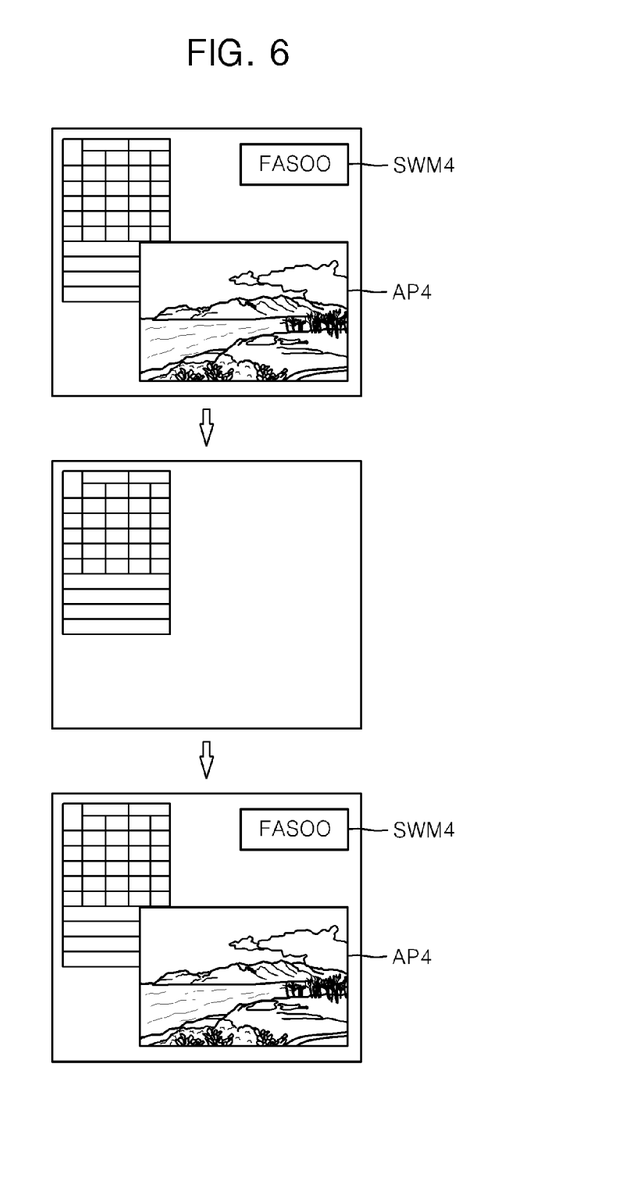

While the application executed or the application corresponding to the document opened by the user's manipulation operates, when a window corresponding to the executed application or the opened document disappears from a screen, the watermark display unit 150 may cause the watermark displayed on the screen to disappear. As illustrated in FIG. 6, for example, while an application included in the watermark display target information is executed by the user's manipulation, and thereby a watermark (SWM4) and a window (AP4) corresponding to the application are displayed on a screen, when the application window (AP4) disappears from a screen by the user's manipulation such as minimize, the watermark (SWM4) displayed on the screen also disappears. Then, when the application window (AP4) is displayed again on the screen by the user's manipulation, the watermark (SWM4) is also displayed on the screen. That is, as long as the application window (AP4) is displayed on the screen, the watermark (SWM4) may also move in the screen but not be hidden or be moved outside the screen.

In this way, the watermark is displayed on a screen only when important content or confidential content is actually displayed on the screen. Accordingly, it is possible to effectively increase user awareness of security. Further, when no important content or confidential content is actually displayed on a screen, the watermark disappears from the screen. Therefore, it is possible to remove elements disturbing the user's tasks.

The watermark display unit 150 displays the watermark on a screen based on the watermark display information included in the screen watermark display policies. That is, the watermark display unit 150 uses content of the watermark, a display size of the watermark, a display position of the watermark, and the like, which are included in the watermark display information, and may display the watermark in a corresponding position and a corresponding size on a screen. For example, the watermark display information includes "secret" as the content of the watermark, "a width of 10 cm and a height of 5 cm" as the display size of the watermark, and "(10, 10)" as the display position of the watermark, the word "secret" is displayed in a position of "(10, 10)" with respect to an upper-left corner of the screen and in a size of a width of 10 cm and a height of 5 cm.

When the screen watermark display policies are set differently for each user, the watermark display unit 150 may display the watermark on a screen using a screen watermark display policy corresponding to the user. That is, the watermark display unit 150 may differently set the content of the watermark and the position or the size in which the watermark is displayed for each user. For example, when an application is executed by a user 1's manipulation, a watermark 1 having a size 1 is displayed in a position 1 on a screen based on a screen watermark display policy 1, and when an application is executed by a user 2's manipulation, a watermark 2 having a size 2 is displayed in a position 2 on a screen based on a screen watermark display policy 2.

Hereinafter, operations of the watermark display apparatus 100 according to an embodiment of the present invention will be described in detail with reference to FIG. 7.

Figure 7:
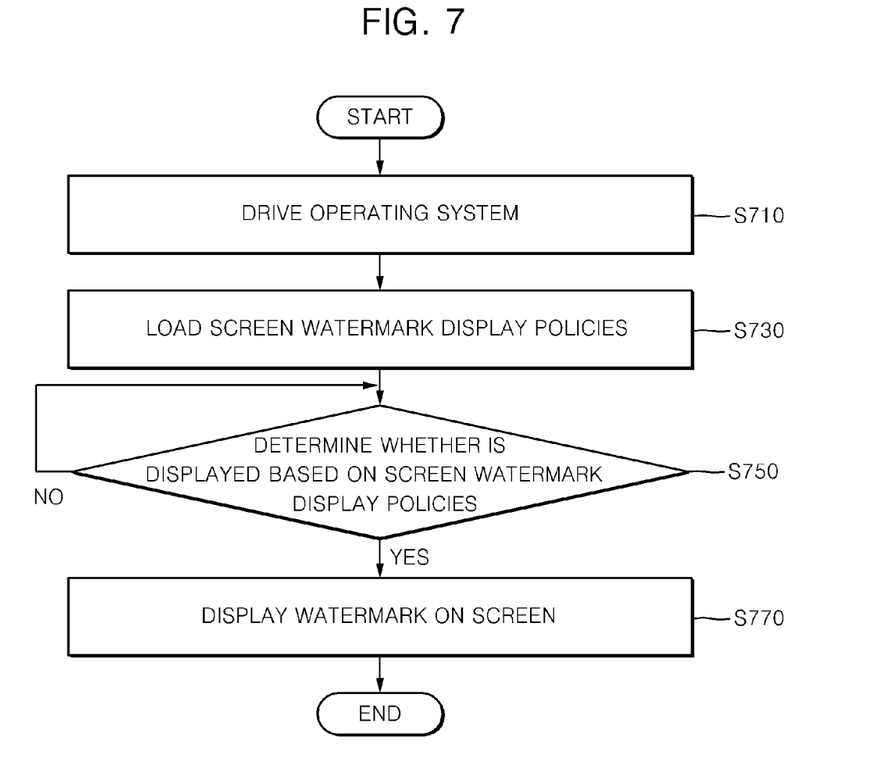
FIG. 7 is a flowchart illustrating a watermark display process according to an embodiment of the present invention.

FIG. 7 is a flowchart illustrating a watermark display process according to an embodiment of the present invention.

When power of the watermark display apparatus 100 is turned on by the user's manipulation, the OS installed in the watermark display apparatus 100 is driven (S710), the screen watermark display policies are loaded (S730).

Then, it is determined whether the watermark is displayed based on the screen watermark display policies (S750). That is, it is determined whether the OS item, the item corresponding to the application executed or the document opened by the user's manipulation, and the like are included in the watermark display target information.

When it is determined that the watermark is displayed (Yes in S750), the watermark is displayed on a screen (S770). In this case, the watermark may be displayed on a screen as an independent window. Also, the watermark may be displayed on a screen based on the watermark display information included in the screen watermark display polices. In addition, while the application or the application corresponding to the document operates, when the application window or the window corresponding to the document disappears from a screen, the watermark displayed on the screen may disappear. On the other hand, when it is determined that no watermark is displayed (No in S750), the user's manipulation is awaited, and when there is the user's manipulation, it is determined whether the watermark is displayed (S750).

The present invention may also be implemented as a computer readable code in a computer readable recording medium. The computer readable recording medium includes any type of recording apparatus in which data can be read by a computer apparatus is stored. Examples of the computer readable recording medium include a ROM, a RAM, a CD-ROM, a magnetic tape, a floppy disk, and an optical data storage apparatus, and also include implementation in the form of a carrier wave (for example, transmission via the Internet). In addition, the computer readable recording medium may be distributed to a computer apparatus connected via a wireless and/or wired communication network and a code that can be read by a computer may be stored and executed in a distributed manner.

In the above description, while exemplary embodiments of the present invention have been described in detail, the present invention is not limited to the aforementioned specific exemplary embodiments. Those skilled in the art may variously modify the invention without departing from the gist of the invention claimed by the appended claims and the modifications are within the scope of the claims.

What is claimed is:

1. A watermark display apparatus comprising a processor and a memory storing program codes executed by the processor, wherein the program codes are configured to
receive or intercept a message generated from an operating system (OS) when an application is executed or a document is opened by a user's manipulation;
determine whether a watermark is displayed based on screen watermark display policies and the message generated from the OS; and display the watermark on a screen when it is determined that the watermark is displayed.

2. The apparatus according to claim 1, wherein the screen watermark display policies include watermark display target information including at least one of an OS item, an application item, and a document item, which are watermark display targets, and when an application is executed or a document is opened by the user's manipulation, it is determined whether an item corresponding to the executed application or the opened document is included in the watermark display target information using the message generated from the OS, and when the item corresponding to the executed application or the opened document is included in the watermark display target information, it is determined that the watermark is displayed.

3. The apparatus according to claim 1, wherein the screen watermark display policies include watermark display information including at least one of content of the watermark, a display size of the watermark, and a display position of the watermark, and the watermark is displayed on a screen based on the watermark display information.

4. The apparatus according to claim 1, wherein the watermark is displayed on a screen as a window independent from a window corresponding to the executed application or the opened document.

5. The apparatus according to claim 4, wherein the window on which the watermark is displayed is displayed in an internal area of the window corresponding to the executed application or the opened document.

6. The apparatus according to claim 1, wherein, while an application corresponding to the executed application or the opened document operates, when a window corresponding to the executed application or the opened document disappears from a screen, the watermark disappears from the screen.

7. The apparatus according to claim 1, wherein the screen watermark display policies are set differently for each user.

8. A method of displaying a watermark, comprising:
monitoring a message generated from an operating system (OS) when an application is executed or a document is opened by a user's manipulation;
determining whether a watermark is displayed based on screen watermark display policies and the message; and
displaying the watermark on a screen when it is determined that the watermark is displayed.

9. The method according to claim 8, wherein the screen watermark display policies include watermark display target information including at least one of an OS item, an application item, and a document item, which are watermark display targets, and the determining of whether a watermark is displayed includes:
determining, when an application is executed or a document is opened by the user's manipulation, whether an item corresponding to the executed application or the opened document is included in the watermark display target information using the message generated from the OS; and
determining that the watermark is displayed when the item corresponding to the executed application or the opened document is included in the watermark display target information.

10. The method according to claim 9, wherein the watermark display target information includes a type item of the application or a type item of the document, which is a watermark display target.

11. The method according to claim 9, wherein each item included in the watermark display target information corresponds to information on a time at which the watermark is displayed.

12. The method according to claim 8,
wherein the screen watermark display policies include watermark display information including at least one of content of the watermark, a display size of the watermark, and a display position of the watermark, and
in the displaying of the watermark, the watermark is displayed on a screen based on the watermark display information.

13. The method according to claim 8, wherein, in the displaying of the watermark, the watermark is displayed on a screen as a window independent from a window corresponding to the executed application or the opened document.

14. The method according to claim 13, wherein, in the displaying of the watermark, the window on which the watermark is displayed is displayed in an internal area of the window corresponding to the executed application or the opened document.

15. The method according to claim 13, wherein, in the displaying of the watermark, when a size or a position of the window corresponding to the executed application or the opened document is changed, a size and a position of the window on which the watermark is displayed are maintained without change.

16. The method according to claim 13, wherein, in the displaying of the watermark, when a size or a position of the window corresponding to the executed application or the opened document is changed, a size of the window on which the watermark is displayed is maintained without change and a position thereof is changed.

17. The method according to claim 8, wherein, in the displaying of the watermark, while an application corresponding to the executed application or the opened document operates, when a window corresponding to the executed application or the opened document disappears from a screen, the watermark displayed on the screen disappears.

18. The method according to claim 8, wherein the screen watermark display policies are set differently for each user.

19. A non-transitory computer readable recording medium recording a program causing a computer to execute the watermark display method according to any one of claim 8.

* * * * *